(12) United States Patent
Thawonmas et al.

(10) Patent No.: US 6,882,747 B2
(45) Date of Patent: Apr. 19, 2005

(54) TEXT MINING METHOD AND APPARATUS FOR EXTRACTING FEATURES OF DOCUMENTS

(75) Inventors: Ruck Thawonmas, Kochi (JP); Akio Sakamoto, Kochi (JP); Shinji Mizobuchi, Kochi (JP); Masutatsu Yoshioka, Kochi (JP)

(73) Assignee: SSR Co., LTD, Kochi (JP)

( * ) Notice: Subject to any disclaimer, the term of this patent is extended or adjusted under 35 U.S.C. 154(b) by 702 days.

(21) Appl. No.: 09/871,272

(22) Filed: May 31, 2001

(65) Prior Publication Data

US 2002/0031260 A1 Mar. 14, 2002

(30) Foreign Application Priority Data

Jun. 29, 2000 (JP) .................................... 2000-197421

(51) Int. Cl.⁷ ............................................... G06K 9/46
(52) U.S. Cl. ......................... 382/190; 382/224; 707/1
(58) Field of Search ........................... 382/190, 100, 382/224, 305; 707/1, 200, 104.1, 6

(56) References Cited

U.S. PATENT DOCUMENTS

| | | | |
|---|---|---|---|
| 5,857,179 A | | 1/1999 | Vaithyanathan et al. |
| 5,884,305 A | | 3/1999 | Kleinberg et al. |
| 6,611,825 B1 | * | 8/2003 | Billheimer et al. ........... 706/45 |
| 6,665,661 B1 | * | 12/2003 | Crow et al. ..................... 707/3 |
| 6,728,728 B1 | * | 4/2004 | Spiegler et al. ......... 707/103 R |
| 2002/0194158 A1 | * | 12/2002 | Stensmo ........................ 707/2 |

FOREIGN PATENT DOCUMENTS

WO    WO 02/17128 A1    2/2002

OTHER PUBLICATIONS

Wong et al. "Vector Space Model of Information Retrieval: a Reevaluation" Proc. 7ᵗʰ Int. ACM SIGIR Conf. on Research and Development in Information Retrieval, 1984, pp. 167–185.*

Wong et al. "On Modeling of Information Retrieval Concepts in Vector Spaces" Proc. 1995 ACM SIGMOD Int. Conf. on Management of Data, 1995, pp. 163–174.*

(Continued)

*Primary Examiner*—Jon Chang
(74) *Attorney, Agent, or Firm*—Workman Nydegger

(57) ABSTRACT

Concerning feature extraction of documents in text mining, a method and an apparatus for extracting features having the same nature as those by LSA are provided that require smaller memory space and simpler program and apparatus than the apparatus for executing LSA. Features of each document are extracted by feature extracting acts on the basis of a term-document matrix updated by term-document updating acts and of a basis vector, spanning a space of effective features, calculated by basis vector calculations. Execution of respective acts is repeated until a predetermined requirement given by a user is satisfied.

25 Claims, 12 Drawing Sheets

OTHER PUBLICATIONS

Faloutsos et al. "FastMap: A Fast Algorithm for Indexing, Data–Mining and Visualization of Traditional and Multimedia Datasets" ACM Transactions on Database Systems, vol. 12, No. 2, Jun. 1987, pp. 299–321.*

Jerome R. Bellegarda et al., *A Novel Word Clustering Algorithm Based on Latent Semantic Analysis,* IEEE International Conference on Acoustics, Speech and Signal Processing, 1996, pp. 172–175.

Garard Salton, *Automatic Text Processing, The Transformation, Analysis, and Retrieval of Information by Computer,* Addison–Wesley Publishing Company, pp. 278–281 and 312–319, 1989.

Scott Deerwester et al., *Indexing by Latent Semantic Analysis,* Journal of the American Society for Information Science, vol. 41(6), pp. 391–407, 1990.

Susan T. Dumais, *Improving the Retrieval of Information for External Sources,* Behavior Research Methods, Instruments, & Computers, vol. 23(2), pp. 229–236, 1991.

Gene H. Golub, *Matrix Computations, Third Edition,* The John Hopkins University Press, Chapter 8, pp. 448–457, 1996.

James C. Bezdek, *A Review of Probabilistic, Fuzzy, and Neural Models for Pattern Recognition,* Journal of Intelligent and Fuzzy Systems, vol. 1(1), pp. 1–25, 1993.

* cited by examiner

Document1: LET ME KNOW ABOUT ENTRANCE-EXAM BY RECOMMENDATION AND ABOUT EDUCATION POLICY OF THE UNIVERSITY Document2: LET ME KNOW ABOUT THE OUTLINE OF FALL ADMISSON FOR STUDENTS WHO ARE "RONIN"

Document3: LET ME KNOW ABOUT FALL ADMISSION AND ABOUT EDUCATION POLICY OF THE SCHOOL

FIG.1
(PRIOR ART)

|                        | DOCUMENT 1 | DOCUMENT 2 | DOCUMENT 3 |
|------------------------|:----------:|:----------:|:----------:|
| INDEX TERM/DOCUMENT    |            |            |            |
| RECOMMENDATION         | 1          | 0          | 0          |
| ENTRANCE-EXAM          | 1          | 0          | 0          |
| UNIVERSITY             | 1          | 0          | 0          |
| EDUCATION              | 1          | 0          | 1          |
| POLICY                 | 1          | 0          | 1          |
| "RONIN"                | 0          | 1          | 0          |
| STUDENTS               | 0          | 1          | 0          |
| FALL                   | 0          | 1          | 1          |
| ADMISSION              | 0          | 1          | 1          |
| OUTLINE                | 0          | 1          | 0          |
| SCHOOL                 | 0          | 0          | 1          |

FIG. 2
(PRIOR ART)

Question: LET ME KNOW ABOUT THE ADMISSION SYSTEM FOR STUDENTS WHO ARE "RONIN" AND ABOUT EDUCATION POLICY OF THE UNIVERSITY

FIG.3
(PRIOR ART)

| INDEX TERM/DOCUMENT | QUESTION |
|---|---|
| RECOMMENDATION | 0 |
| ENTRANCE-EXAM | 0 |
| UNIVERSITY | 1 |
| EDUCATION | 1 |
| POLICY | 1 |
| "RONIN" | 1 |
| STUDENTS | 1 |
| FALL | 0 |
| ADMISSION | 1 |
| OUTLINE | 0 |
| SCHOOL | 0 |

FIG. 4
(PRIOR ART)

TEXT MINING METHOD AND APPARATUS FOR EXTRACTING FEATURES OF DOCUMENTS

CROSS-REFERENCE TO RELATED APPLICATIONS

This application claims priority to Japanese Patent Application No. 2000-197421 filed on Jun. 29, 2000, the contents of which is incorporated herein by specific reference.

BACKGROUND OF THE INVENTION

1. Field of the Invention

The present invention relates to a text mining method and apparatus for extracting features of documents. In particular, the invention relates to a text mining method and apparatus for extracting features of documents, wherein features are extracted such that all mutually associated documents and terms are placed near each other in the feature space. Applications of the invention include document and/or web retrieval, associated term retrieval, document classification.

2. Description of the Related Art

In text mining as a technology for squeezing desired knowledge or information by making analysis of text data, effective feature extraction of documents is an important task for efficiently performing document and/or web retrieval, associated term retrieval, document classification and so on. As a typical document feature extracting method, a vector-space model as set out on page 313 of "Automatic Text Processing" (Addison-Wesley, 1989) is frequently used.

In the vector-space model, when terms selected as indices in the documents, namely index terms representing the contents of the documents, are t in number, a vector $V_i$ is used respectively to correspond to an index term $T_i$ to define a t-dimensional vector space. All vectors forming thus the defined vector space can be expressed as a linear combination of t in number of the vectors corresponding to t in number of the index terms. In this vector space, a document $D_r$ is expressed as follows:

$$D_r = \sum_{i=1}^{t} x_{ir} V_i \quad (1)$$

In the foregoing expression (1), $x_{ir}$ active on $V_i$ is the contribution of the index term $T_i$ to the document $D_r$ and represents a feature of the document. The feature is an amount representing the term frequency of the index term in the document. A vector $[x_{r1}, x_{r2}, \ldots x_{rt}]'$ of t×1 (t rows and one column) becomes a feature vector of the document $D_r$. As the simplest case, when the index term $T_i$ appears in the document $D_r$, $x_{ir}$ is set to 1. When the index term $T_i$ does not appear in the document $D_r$, $x_{ir}$ is set to 0. In a more complicated case, as set forth in the foregoing publication on page 279 to 280, two quantities are used. These two quantities are a term frequency $tf_{ri}$ of the index term $T_i$ in the document $D_r$ and a document frequency $df_i$ of documents containing the index term $T_i$ in all documents registered in the document database.

For the group of documents consisting of d in number of documents, a t×d term-document matrix X can be defined as follows:

$$X = [x_1, x_2, \ldots, x_d]$$

Here, a t-dimensional vector $x_j = [x_{j1}, x_{j2}, \ldots, x_{jt}]'$ expresses the feature vector of the document $D_j$, and '(dash) represents matrix inversion.

FIG. 1 is an illustration showing one example of documents, translated from Japanese sentences, registered in a document database, where "ronin" is a romanized word meaning students who, having failed a school entrance-exam of a particular academic year, are preparing for one next year. FIG. 2 is an illustration showing one example of a term-document matrix taking the Kanji (Chinese) characters appearing on the documents shown in FIG. 1 as index terms. Kanji terms are underlined in FIG. 1. In FIG. 2, among a character string "let me know about" appearing in all of the documents 1 to 3, the Kanji term "know" is checked off from the index terms. FIG. 3 is an illustration showing one example of an actual input question, translated from Japanese, from a user, where Kanji terms are underlined. If the index terms of FIG. 2 are used to express the question, the question can be expressed with the term-document matrix shown in FIG. 4.

In general, when the vector-space model is used, similarity sim $(D_r, D_s)$ of two documents $D_r$ and $D_s$ can be expressed as follows:

$$sim(D_r, D_s) = \frac{\sum_{i=1}^{t} x_{ir} x_{is}}{\sqrt{\sum_{i=1}^{t} x_{ir}^2 \sum_{i=1}^{t} x_{is}^2}} \quad (2)$$

When the similarity of the question and each document of FIG. 1 is judged on the basis of the meaning of the question of FIG. 3, the question of FIG. 3 is the most similar to the document 3 of FIG. 1. However, using the feature vectors as shown in FIGS. 2 and 4, the similarity of each document of FIG. 1 and the question of FIG. 3 is respectively sim (document 1, question)=0.5477, sim(document 2, question)=0.5477, sim(document 3, question)=0.5477. In short, all have the same similarity.

As a solution for such a problem, a method called Latent Semantic Analysis (LSA) was proposed in "Journal of the American Society for Information Science" 1990, Vol. 41, No. 6, pp. 391 to 407. This method extracts latent meaning of the documents on the basis of co-occurrences of the terms and is significantly outstanding in terms of retrieving efficiency. Here, "co-occurrences of terms" represents a situation where the terms appear simultaneously in the same documents/statements.

The LSA extracts a latent semantic structure of the documents by performing singular value decomposition (SVD) for the term-document matrix. In the obtained feature space, mutually associated documents and terms are located near each other. In a report placed in "Behavior Research Methods Instruments & Computers" (1991), Vol. 23, No. 2, pp. 229 to 236, retrieval using the LSA indicates a result of 30% higher efficiency in comparison with the vector-space model. LSA will be explained hereinafter in more detail.

In LSA, at first, singular value decomposition is performed for the t×d term-document matrix X as set out below.

$$X = T_0 S_0 D_0' \quad (3)$$

Here, $T_0$ represents an orthogonal matrix of t×m, $S_0$ represents a square diagonal matrix of m×m with taking m in number of the singular values as the diagonal elements and setting 0 to the other elements. $D_0'$ represents an orthogonal matrix of m×d. In addition, let us assume that $0 \geq d \geq t$, and arrange the orthogonal elements of $S_0$ in descending order.

Furthermore, in LSA, with respect to the feature vector $x_q$ of t×1 of a document $D_q$, the following conversion is performed to derive a LSA feature vector $y_q$ of n×1;

$$y_q = S^{-1} T' x_q \tag{4}$$

Here, S is a square diagonal matrix of n×n taking the first to (n)th of the diagonal elements of $S_0$, and T is a matrix of t×n drawing the first to (n)th columns of $T_0$.

As an example, results of singular value decomposition of the term-document matrix shown in FIG. 2 are given below. The matrices $T_0$, $S_0$ and $D_0$ are expressed as follows:

$$T_0 = \begin{bmatrix} 0.1787 & -0.3162 & 0.3393 \\ 0.1787 & -0.3162 & 0.3393 \\ 0.1787 & -0.3162 & 0.3393 \\ 0.4314 & -0.3162 & -0.1405 \\ 0.4314 & -0.3162 & -0.1405 \\ 0.1787 & 0.3162 & 0.3393 \\ 0.1787 & 0.3162 & 0.3393 \\ 0.4314 & 0.3162 & -0.1405 \\ 0.4314 & 0.3162 & -0.1405 \\ 0.1787 & 0.3162 & 0.3393 \\ 0.2527 & 0.0000 & 0.4798 \end{bmatrix}$$

$$S_0 = \begin{bmatrix} 2.7979 & 0 & 0 \\ 0 & 2.2361 & 0 \\ 0 & 0 & 1.4736 \end{bmatrix}$$

$$D_0 = \begin{bmatrix} 0.5000 & -0.7071 & 0.5000 \\ 0.5000 & 0.7071 & 0.5000 \\ 0.7071 & 0.0000 & -0.7071 \end{bmatrix}$$

Let us assume that the dimension t of the LSA feature vectors is 2 and applying the foregoing expression (4) to each feature vector of the term-document matrix in FIG. 2. Then, the LSA feature vectors of the documents 1, 2 and 3 are respectively [0.5000, −0.7071]', [0.5000, 0.7071]' and [0.7071, 0.0000]'. In addition, applying the foregoing expression (4) to the feature vector of FIG. 4, the LSA feature vector of the question from the user becomes [0.6542, 0]'.

Applying the foregoing expression (2) to the LSA feature vectors obtained as set forth above, the similarity of the question of FIG. 3 and each document of FIG. 1, become respectively, sim(document 1, question)=0.5774, sim (document 2, question)=0.5774, and sim(document 3, question)=1.0000. Thus, a result that the document 3 has the highest similarity to the question can be obtained. Considering a help system application or the like utilizing computer networks, an answer statement of the document 3 registered in the document database will be returned to the user who asked the question of FIG. 3.

For singular value decomposition, an algorithm proposed in "Matrix Computations", The Johns Hopkins University Press, 1996, pp. 455 to 457, is frequently used. In the report of "Journal of the American Society for Information Science" set forth above, there is a statement that the value of the number of rows (or columns) n of the square matrix S is preferably about 50 to 150. In addition, in the foregoing report of "Behavior Research Methods, Instruments, & Computers", it has been indicated that better efficiency can be attained by pre-processing using the term frequency or document frequency instead of simply setting each element of the feature vector to 0 or 1 before performing LSA.

However, in the algorithm for singular value decomposition proposed in the foregoing "Matrix Computations", memory space in the order of the square of the number of index terms t ($t^2$) is required at the minimum. This is because a matrix of t×t is utilized for bidiagonalization of a matrix in the process of calculation of basis vectors spanning a feature space from a given term-document matrix. The prior art is therefore not applicable to document database holding a very large number of terms and data. Furthermore, the prior art requires complicated operations of matrices irrespective of the number of data.

SUMMARY OF THE INVENTION

The present invention has been worked out in view of the problems set forth above. In a first aspect of the present invention, a text mining method is provided for extracting features of documents using a term-document matrix consisting of vectors corresponding to index terms representing the contents of the documents. In the term-document matrix, contributions of the index terms to each document act on respective elements of the term-document matrix. The method comprises:

a basis vector calculating step of calculating a basis vector spanning a feature space, in which mutually associated documents and terms are located in proximity with each other, based on a steepest descent method minimizing a cost;

a feature extracting step of calculating a parameter for normalizing features using the term-document matrix and the basis vector, and extracting the features on the basis of the parameter; and a term-document matrix updating step of updating the term-document matrix to a difference between the term-document matrix, to which the basis vector is not applied, and the term-document matrix, to which the basis vector is applied.

In a second aspect of the present invention, a text mining method is provided for extracting features of documents wherein the cost is defined as a second-order cost of the difference between the term-document matrix, to which the basis vector is not applied, and the term-document matrix, to which the basis vector is applied.

In a third aspect of the present invention, a text mining method is provided for extracting features of documents wherein the basis vector calculating step comprises:

an initializing step of initializing a value of the basis vector;

a basis vector updating step of updating the value of the basis vector;

a variation degree calculating step of calculating a variation degree of the value of the basis vector;

a judging step of making a judgment whether a repetition process is to be terminated or not using the variation of the basis vector; and a counting step of counting the number of times of the repetition process.

In a fourth aspect of the present invention, a text mining method is provided for extracting features of documents wherein the basis vector updating step updates the basis vector using a current value of the basis vector, the term-document matrix and an updating ratio controlling the updating degree of the basis vector.

In a fifth aspect of the present invention, a text mining method is provided for extracting features of documents wherein when all basis vectors and normalizing parameters required in extracting the features have been already obtained, the calculation of the normalizing parameters in the basis vector calculating step and the execution of the feature extracting step are omitted. In addition, the feature extracting step extracts the features using the basis vectors and the normalizing parameters that have been already obtained.

In a sixth aspect of the present invention, a text mining apparatus is provided for extracting features of documents using a term-document matrix consisting of vectors corresponding to index terms representing the contents of the documents. In the term-document matrix, contributions of the index terms to each document act on respective elements of the term-document matrix. The apparatus comprises:

basis vector calculating means for calculating a basis vector spanning a feature space, in which mutually associated documents and terms are located in proximity with each other, based on a steepest descent method minimizing a cost;

feature extracting means for calculating a parameter for normalizing features using the term-document matrix and the basis vector, and extracting the features on the basis of the parameter; and term-document matrix updating means for updating the term-document matrix to a difference between the term-document matrix, to which the basis vector is not applied, and the term-document matrix, to which the basis vector is applied.

In a seventh aspect of the present invention, a text mining apparatus is provided for extracting features wherein the cost is defined as a second-order cost of the difference between the term-document matrix, to which the basis vector is not applied, and the term-document matrix, to which the basis vector is applied.

In an eighth aspect of the present invention, a text mining apparatus is provided for extracting features of documents wherein the basis vector calculating means comprises:

initializing means for initializing a value of the basis vector;

basis vector updating means for updating the value of the basis vector;

variation degree calculating means for calculating a variation degree of the value of the basis vector;

judging means for making a judgment whether a repetition process is to be terminated or not using the variation of the basis vector; and counting means for counting the number of times of the repetition process.

In a ninth aspect of the present invention, a text mining apparatus is provided for extracting features of documents wherein the basis vector updating means updates the basis vector using a current value of the basis vector, the term-document matrix and an updating ratio controlling the updating degree of the basis vector.

In a tenth aspect of the present invention, a text mining apparatus is provided for extracting features of documents wherein when all basis vectors and normalizing parameters required in extracting the features have been already obtained, the calculation of the normalizing parameters in the basis vector calculating means and the execution of the feature extracting means are omitted. In addition, the feature extracting means extracts the features using the basis vectors and the normalizing parameters that have been already obtained.

In an eleventh aspect of the present invention, a computer program product is provided for being executed in a text mining apparatus for extracting features of documents using a term-document matrix consisting of vectors corresponding to index terms representing the contents of the documents. In the term-document matrix, contributions of the index terms act on respective elements of the term-document matrix. The computer program product comprises:

a basis vector calculating step of calculating a basis vector spanning a feature space, in which mutually associated documents and terms are located in proximity with each other, based on a steepest descent method minimizing a cost;

a feature extracting step of calculating a parameter for normalizing features using the term-document matrix and the basis vector, and extracting the features on the basis of the parameter; and a term-document matrix updating step of updating the term-document matrix to a difference between the term-document matrix, to which the basis vector is not applied, and the term-document matrix, to which the basis vector is applied.

The feature extracting apparatus disclosed in this specification is constructed by defining a cost as a second-order function of a difference between the term-document matrix, to which the basis vector is not applied, and the term-document matrix, to which the basis vector is applied. The apparatus merely requires the following means:

a. basis vector calculating means for calculating a basis vector applying a steepest descent method to the cost;

b. feature extracting means for calculating a parameter for normalizing features using the term-document matrix and the basis vector, and extracting the features on the basis of the parameter;

c. term-document matrix updating means for updating the term-document matrix to the difference between the term-document matrix, to which the basis vector is not applied, and the term-document matrix, to which the basis vector is applied, in order to prevent redundant extraction of features; and d. feature extraction control means for controlling execution of respective means.

The basis vector calculating means repeats calculation on the basis of the input term-document matrix to finally derive one basis vector. The repetition process is terminated when the variation degree of the basis vector becomes less than or equal to a predetermined reference value.

The feature extracting means calculates a parameter for normalizing the features on the basis of the input basis vector and the term-document matrix, and extracts a feature for each document.

The term-document matrix updating means updates the term-document matrix on the basis of the input basis vector.

The feature extraction control means repeats execution of each means until the number of the features defined by the user is satisfied. When the basis vectors and the normalizing parameters have been already calculated, execution of the basis vector calculating means and calculation of the normalizing parameters in the feature extracting means are omitted. Then, the feature extraction can be performed with the construction incorporating the already obtained basis vectors and the normalizing parameters.

According to the present invention, a text mining method for extracting features of documents using a term-document matrix consisting of vectors corresponding to index terms representing the contents of the documents, wherein contributions of the index terms act on respective elements of the term-document matrix, comprises the following steps:

i. a basis vector calculating step of calculating a basis vector spanning a feature space, wherein mutually associated documents and terms are located in proximity with each other based on a steepest descent method minimizing a cost;
  ii. a feature extracting step of calculating a parameter for normalizing features using the term-document matrix and the basis vector, and extracting the features on the basis of the parameter;
  iii. a term-document matrix updating step of updating the term-document matrix to a difference between the term-document matrix, to which the basis vector is not applied, and the term-document matrix, to which the basis vector is applied; and
  iv. a feature extraction control step of controlling execution of respective steps.

Therefore, concerning feature extraction of documents in text mining, the features having the same nature as those obtained by LSA can be extracted with smaller memory space than the apparatus or method executing LSA. In addition, specific software or hardware for extracting the features can be easily implemented.

The above and other objects, characteristics and advantages of different embodiments of the present invention will become more apparent from the following descriptions of embodiments thereof taken in conjunction with the accompanying drawings.

BRIEF DESCRIPTION OF THE DRAWINGS

FIG. 1 is an illustration showing one example of documents registered in a document database;

FIG. 2 is an illustration showing one example of a term-document matrix with taking Kanji terms appearing in the documents shown in FIG. 1 as index terms;

FIG. 3 is an illustration showing one example of a question actually input by a user;

FIG. 4 is an illustration showing a term-document matrix obtained from the question in FIG. 3;

DESCRIPTION OF THE PREFERRED EMBODIMENTS

Figure 5:
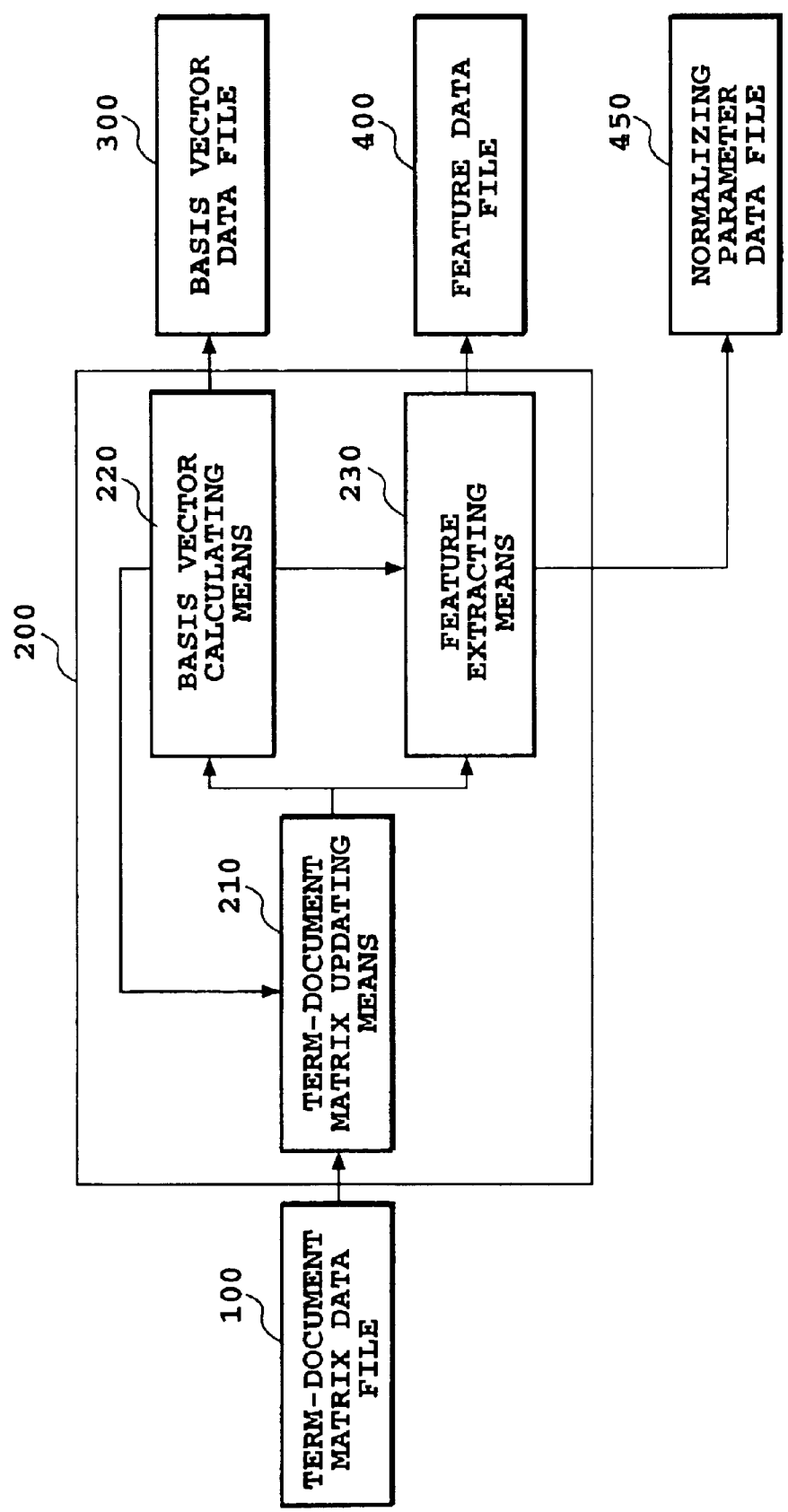
FIG. 5 is an illustration showing one embodiment of a feature extracting apparatus according to the present invention.

FIG. 5 is an illustration showing one embodiment of a feature extracting apparatus according to the present invention. As shown in FIG. 5, feature extraction control means 200 has term-document matrix updating means 210, basis vector calculating means 220, feature extracting means 230. The reference numeral 100 denotes a term-document matrix data file, 300 denotes a basis vector data file, 400 denotes a feature data file, 450 denotes a normalizing parameter data file. In the term-document matrix data file 100, a term-document matrix of collected document data is stored. The term-document matrix updating means 210 reads the term-document matrix from the term-document matrix data file 100, and transfers the read term-document matrix to the basis vector calculating means 220 and the feature extracting means 230 without updating the term-document matrix, in a first iteration process.

In a second and subsequent iteration processes, the terms-document matrix is updated on the basis of the basis vector transferred from the basis vector calculating means 220. The result of updating is transferred to the basis vector calculating means 220 and the feature extracting means 230. The basis vector calculating means 220 calculates one basis vector through a repetition process based on the term-document matrix transferred from the term-document matrix updating means 210. Then, the degree of variation of the basis vector in respective repetition is monitored for terminating the repetition process when the degree of variation becomes less than or equal to a predetermined reference value. The basis vector calculating means 220 stores the calculated basis vector in the basis vector data file 300 and in conjunction therewith, transfers the calculated basis vector to the term-document matrix updating means 210 and the feature extraction means 230. The feature extracting means 230 extracts one feature of each document on the basis of the term-document matrix transferred from the term-document matrix updating means 210 and the basis vector transferred from the basis vector calculating means 220. The result is stored in the feature data file 400, and also the parameter for normalizing the features is stored in the normalizing parameter data file 450.

Execution of the term-document matrix updating means 210, the basis vector calculating means 220 and the feature extracting means 230 is taken as one iteration process. Number of times of iteration processes will be indicated by suffix i, and number of features designated by the user is indicated by suffix n. The feature extraction control means 200 repeats the process until a condition, i=n is satisfied. On the other hand, in a case where all of the required basis vectors and the required normalizing parameters have already been obtained, execution of the basis vector calculation means 220 and calculation of the normalizing parameters in the feature extracting means 230 may be omitted. Therefore, in such a case, the feature extraction control means 200 may be constructed with the term-document matrix updating means 210 incorporating the known basis vectors and normalizing parameters, and with the feature extracting means 230.

Figure 6:
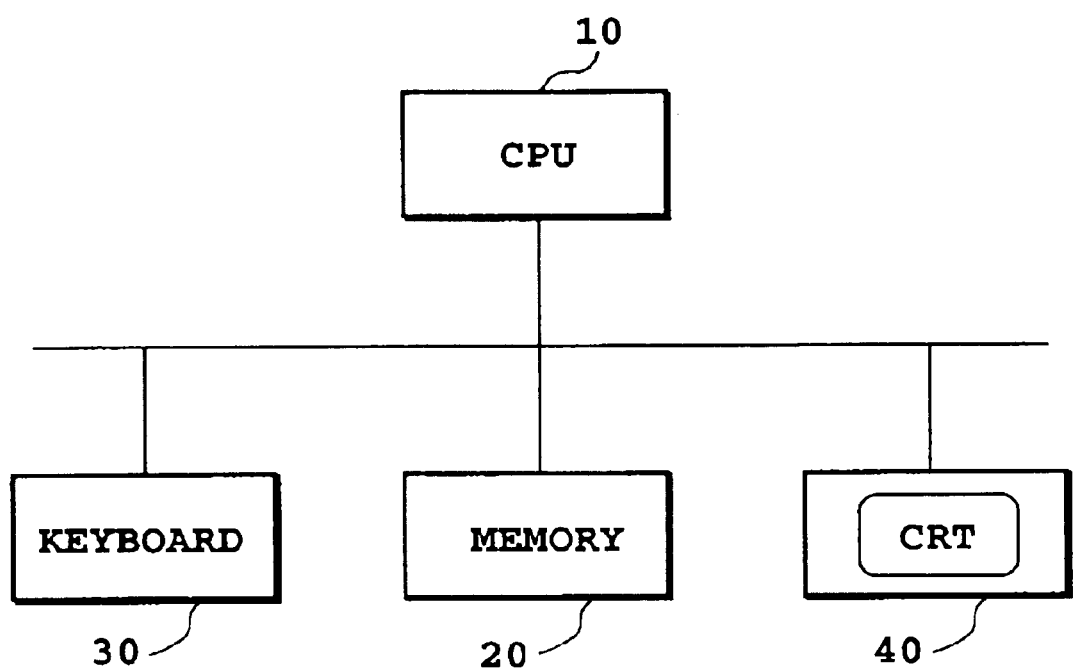
FIG. 6 is an illustration showing one example of a hardware construction for implementing the present invention.

FIG. 6 is an illustration showing one example of a hardware construction for implementing the present invention. As shown in FIG. 6, the feature extracting apparatus includes the following components:

a central processing unit (CPU) 10 performing control for the overall apparatus,
  a memory 20 for storing the program and providing a temporary data storage region required for executing the program,
  a keyboard 30 for inputting data, and
  a display 40 for generating a display screen.

The programs to be executed by the feature extraction control means 200, the term-document matrix data file 100, the basis vector data file 300, the feature data file 400, and the normalizing parameter data file 450 are stored in the memory 20.

By taking this construction, the feature extraction is performed by CPU 10 receiving the command from the user through the keyboard 30, a mouse pointing a desired position on the display 40, or the like. It should be noted that, in the example shown in FIG. 5, the feature extraction control means 200 has a stand-alone construction. However, the feature extraction control means 200 may be built-in other systems.

Figure 7:
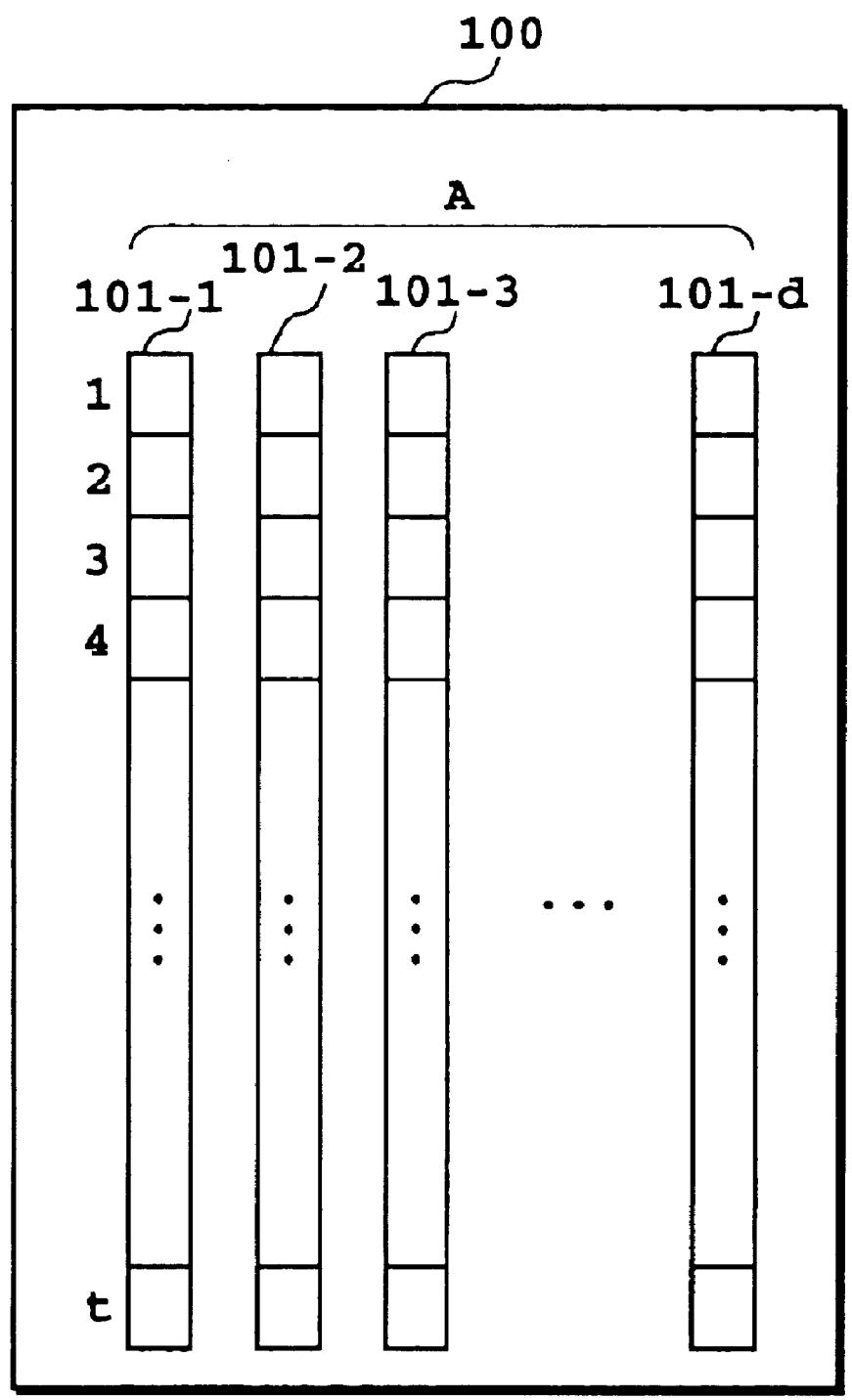
FIG. 7 is an illustration showing a structure of a term-document matrix data file.

FIG. 7 is an illustration showing a structure of the term-document matrix data file. In FIG. 7, the reference numerals 101-1, 101-2, . . . , 101-d correspond to t-dimensional term-document data A consisting of d in number of data. Here, $X=[x_1, x_2, \ldots x_d]$, $x_j=[x_{j1}, x_{j2}, \ldots x_{jt}]'$ are defined to express the term-document data A with a t×d matrix X.

Figure 8:
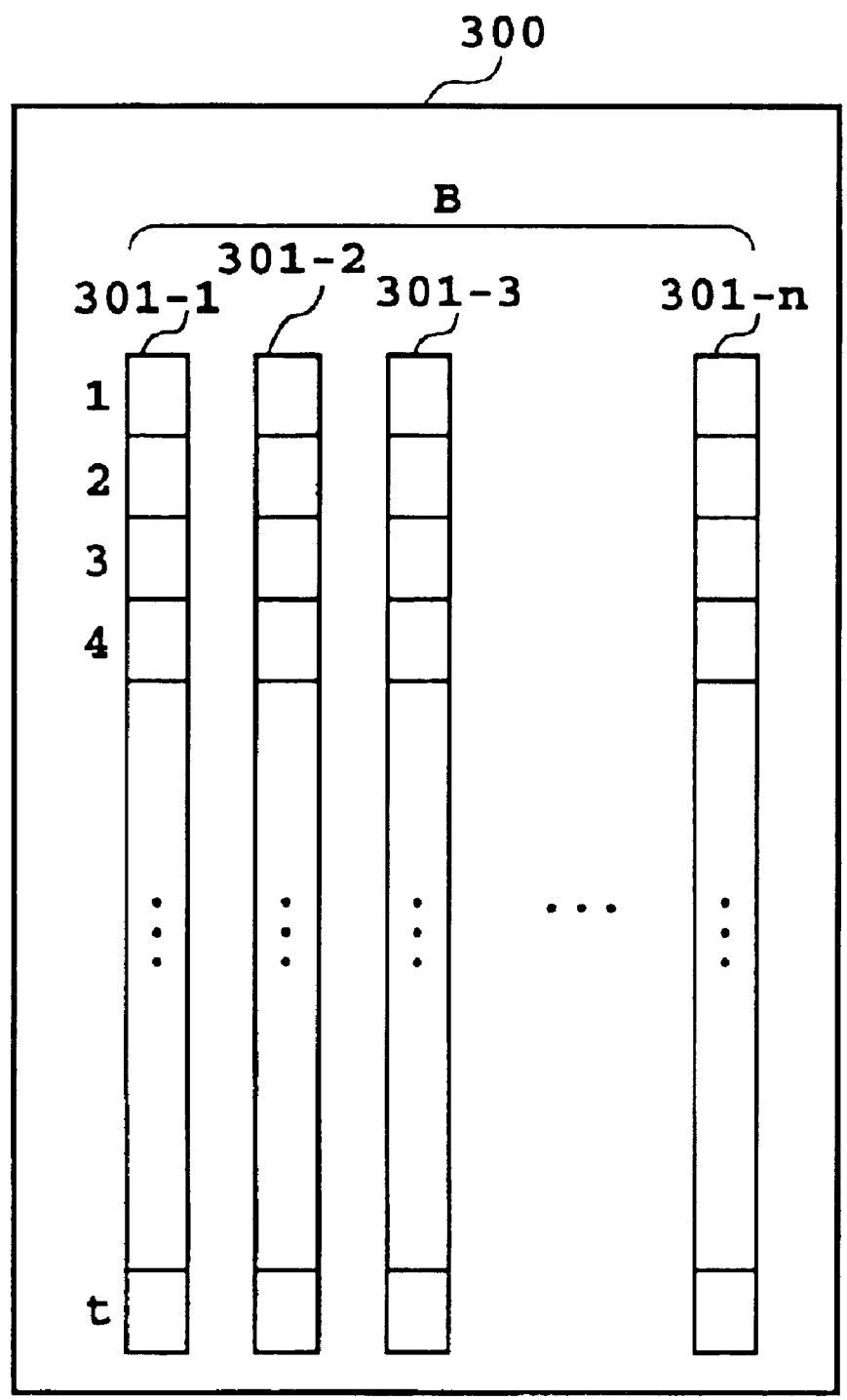
FIG. 8 is an illustration showing a structure of a basis vector data file, wherein the calculated basis vectors are stored.

FIG. 8 is an illustration showing a structure of the basis vector data file storing the calculated basis vectors. In FIG. 8, the reference numerals 301-1, 301-2, . . . 301-n correspond to t-dimensional basis vector data B consisting of n in number of data. The (i)th element 301-i corresponds to an output value of the basis vector calculating means 220 in the (i)th iteration process in FIG. 5. In the following disclosure, this element is expressed by a t×1 column vector $w_i=[w_{i1}, w_{i2}, \ldots, w_{it}]'$.

Figure 9:
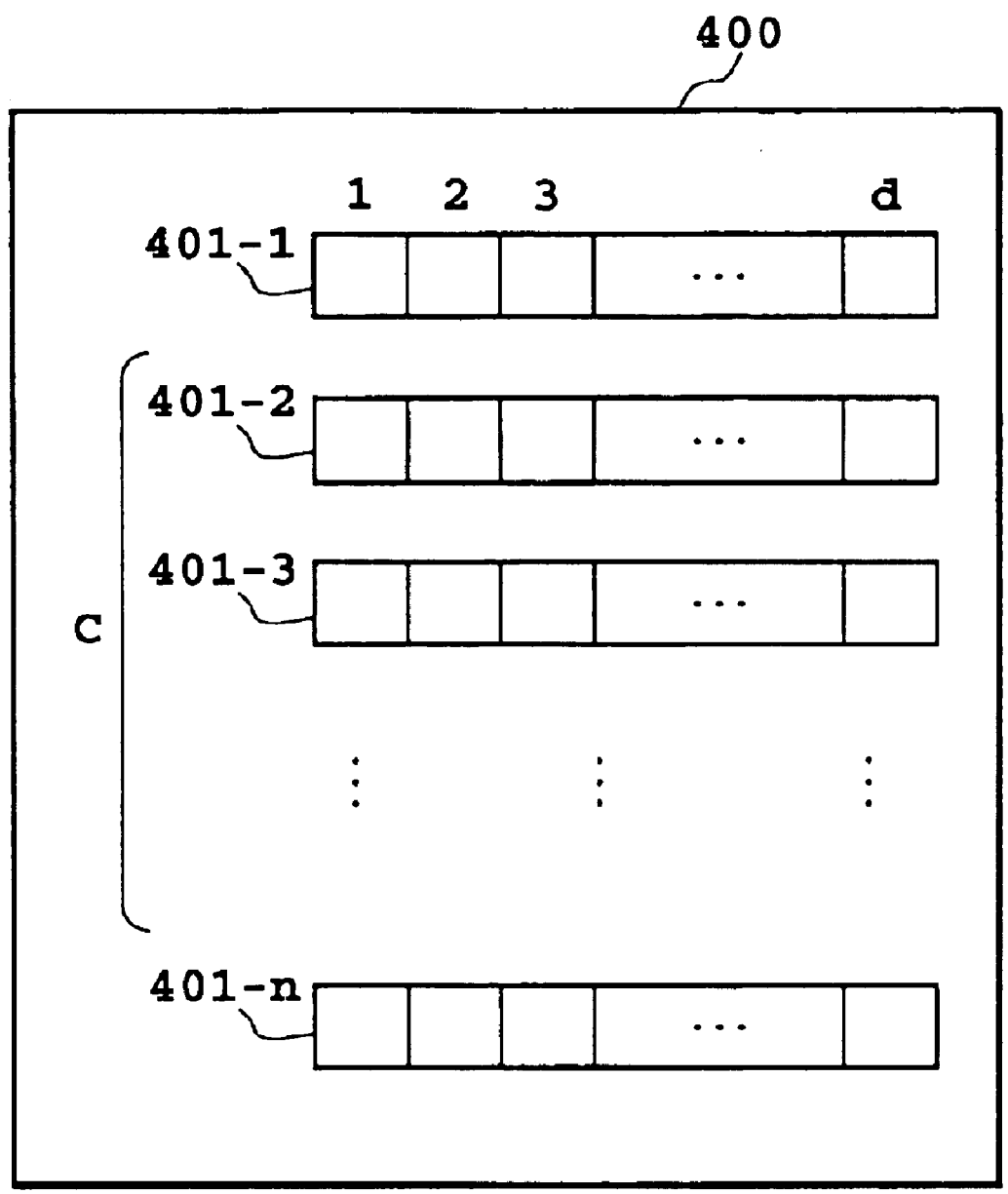
FIG. 9 is an illustration showing a structure of a feature data file.

FIG. 9 is an illustration showing a structure of the feature data file. In FIG. 9, the reference numerals 401-1, 401-2, . . . , 401-n correspond to d-dimensional feature data C consisting of n in number of data. The (i)th element 401-i corresponds to an output value of the feature by the feature extraction means 230 in the (i)th iteration process in FIG. 5. This element is expressed by an 1×d row vector $y_i=[y_{i1}, y_{i2}, \ldots, y_{id}]$.

Figure 10:
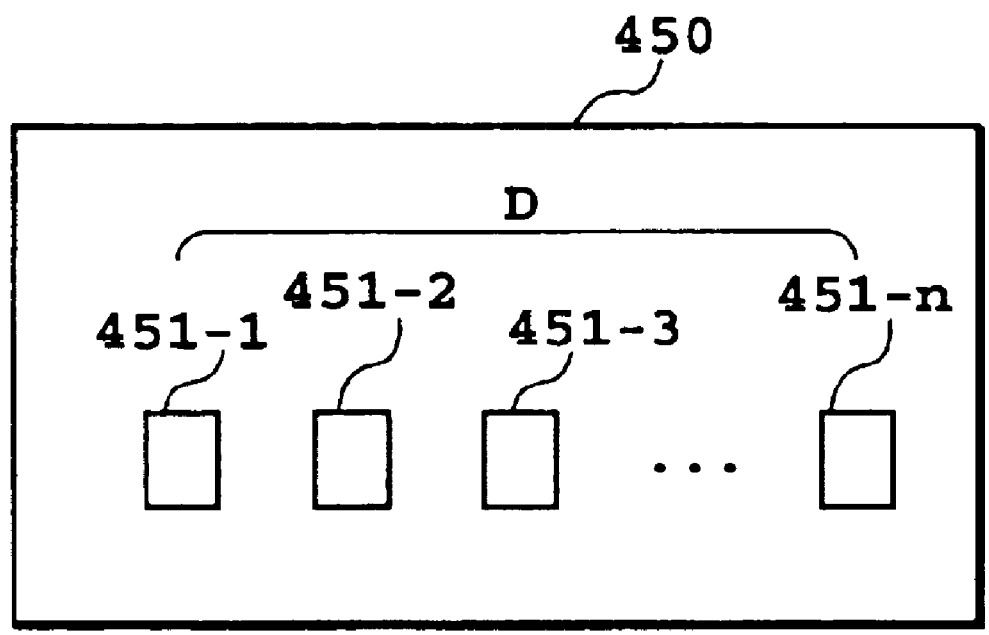
FIG. 10 is an illustration showing a structure of a normalizing parameter data file.

FIG. 10 is an illustration showing a structure of the normalizing parameter data file. In FIG. 10, the reference numerals 451-1, 451-2, . . . , 451-n correspond to normalizing parameter data D consisting of n in number of data. The (i)th element 451-i corresponds to an output value of the normalizing parameter by the feature extracting means 230 in the (i)th iteration process in FIG. 5.

Using the foregoing definitions, an implementation of feature extraction in the shown embodiment will be explained. The term-document matrix updating means 210 reads out X from the term-document matrix data file 100 only when i=1, namely in the first iteration process, to store in a t×d matrix E without performing any arithmetic operation. Accordingly, $E=[e_1, e_2, \ldots, e_d]$, $e_j=[e_{j1}, e_{j2}, \ldots, e_{jt}]'=[X_{j1}, X_{j2}, \ldots, X_{jt}]'$. In order to prevent redundant extraction of the features extracted in the preceding iteration processes, E is updated in the (i)th iteration using the current value and the basis vector calculated in the immediately preceding iteration process. The result of updating is transferred to the basis vector calculating means 220. A value of E in the (i)th iteration, E(i), will be expressed by the following expression (5):

$$E(i) = \begin{cases} X, & \text{for } i = 1 \\ E(i-1) - w_{i-1}(w'_{i-1}E(i-1)), & \text{otherwise} \end{cases} \quad (5)$$

Here, $E(i)=[e_1(i), e_2(i), \ldots, e_d(i)]$, each element $e_j(i)$ of E(i) is defined by $e_j(i)=[e_{j1}(i), e_{j2}(i), \ldots, e_{jt}(i)]'$. Namely, when $i \geq 2$, the term-document matrix is updated to a difference derived by subtracting the term-document matrix, to which the basis vector is applied, from the term-document matrix, to which the basis vector is not applied.

Figure 11:
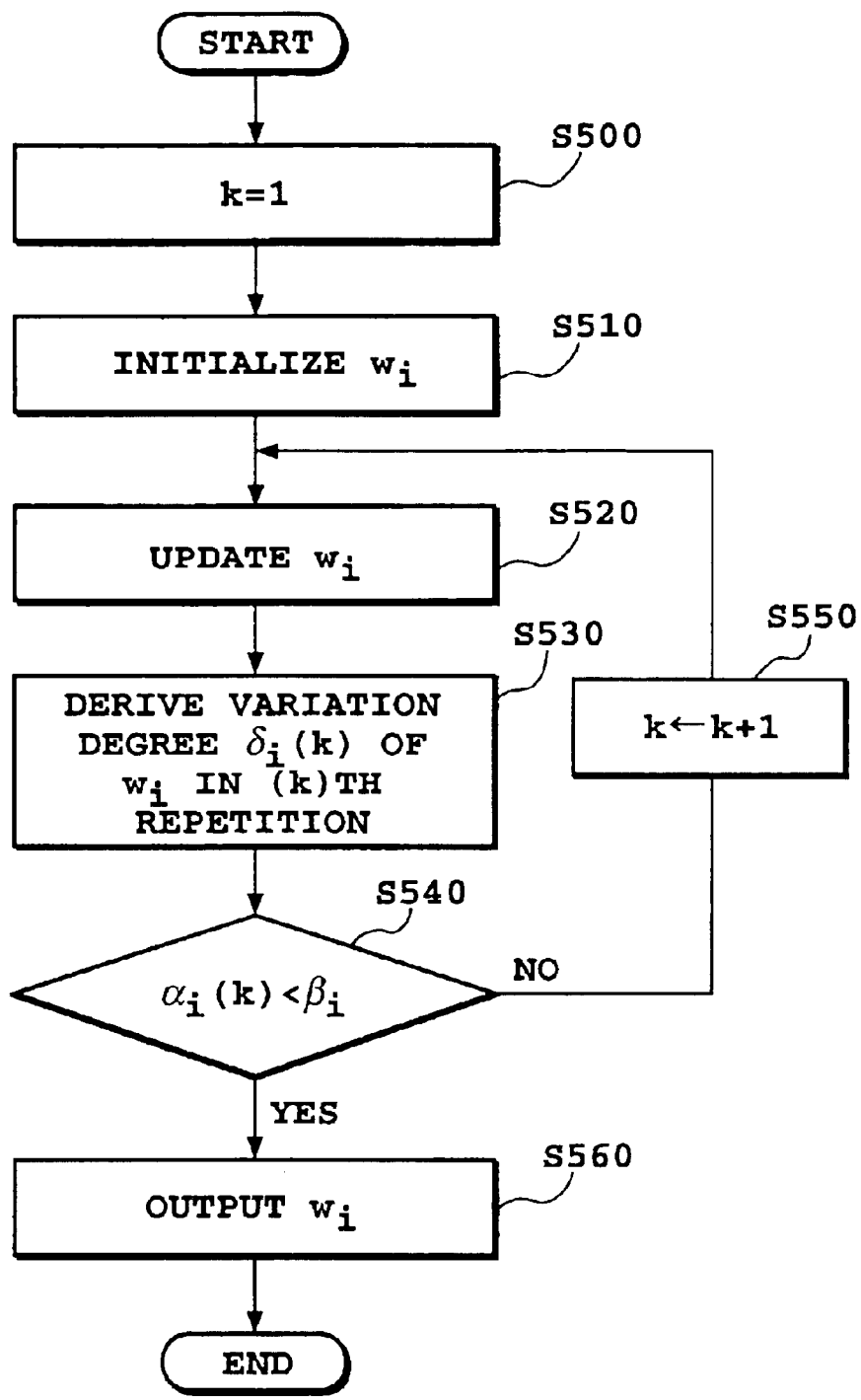
FIG. 11 is a flowchart showing calculation of a basis vector in basis vector calculating means.

FIG. 11 is a flowchart showing calculation of the basis vector in the basis vector calculating means. In FIG. 11, a value of $w_i$ in the (k)th repetition is expressed by $w_i(k)=[w_{i1}(k), w_{i2}(k), \ldots, w_{it}(k)]'$. At first, at step S500, the suffix k is initialized to 1. Subsequently, the process is advanced to step S510 to initialize respective element of $w_i(1)$ with an arbitrary value between −C to C. Here, the value of C may be a positive small value, such as C=0.01. At step S520, in order to calculate the basis vector spanning a feature space where mutually associated documents and terms are located in proximity with each other, a second-order cost expressed by the following expression (6) is provided.

$$\frac{1}{2d}\sum_{m=1}^{d}\sum_{l=1}^{t}(e_{lm}(i) - w_{li}\tilde{y}_{im})^2 \quad (6)$$

Here, "terms are placed in proximity" means that the positions of the terms are close with each other within a feature space, and "documents are placed in proximity" means that the positions of terms included in respective documents are close in the feature space. On the other hand, a cost means an object to be minimized. In t the shown embodiment, the cost is defined as a second-order function of the difference between the term-document matrix, to which the basis vector is not applied, and the term-document matrix, to which the basis vector is applied, as expressed by the expression (6). Here, $$\tilde{y}_{im}$$

is the (m)th element of a 1×d vector $\tilde{y}_i$ which is defined as follows:

$$\tilde{y}_i=[\tilde{y}_{i1}, \tilde{y}_{i2}, \ldots, \tilde{y}_{id}]=w_i'E(i) \quad (7)$$

For the cost, the steepest descent method is applied to update the value of $w_i$ as expressed by the following expression (8).

$$w_i(k+1) = w_i(k) + \frac{\mu_i(k)}{d}(E(i) - w_i(k)z_i(k))z_i(k)' \quad (8)$$

Here, $\mu_i(k)$ is an update ratio controlling the degree of updating in the (k)th repetition, which is initialized by a positive small value when k is 1, such as $\mu_i(1)=0.1$. Every time of increment of k, the value is decreased gradually. In the alternative, it is also possible to set the value at a constant value irrespective of k. On the other hand, $z_i(k)$ is defined as follows:

$$z_i(k)=w_i(k)'E(i) \quad (9)$$

At step S530, $\delta_i(k)$ indicating the degree of variation of $w_i$ is derived as follows:

$$\delta_i(k) = \sqrt{\sum_{j=1}^{i}(w_{ji}(k+1) - w_{ji}(k))^2} \quad (10)$$

At step S540, a judgment is made whether the process is to be terminated or not on the basis of the value of $\delta_i(k)$. As a result of the judgment, if termination is determined, the process is advanced to step S560, and otherwise, the process is advanced to step S550. Here, in FIG. 11, $\beta_i$ is a positive small value, such as $\beta_i=1\times10^{-6}$.

At step S550, the value of the counter k is incremented by 1. Then, the process is returned to step S520. At step S560, $w_i$ is stored as the (i)th data of the basis vector data file 300. At the same time, $w_i$ is transferred to the term-document matrix updating means 210 and the feature extracting means 230. In the feature extracting means 230, the feature $y_i$ and the normalizing parameter $p_i$ are calculated in the following manner.

$$y_i = \tilde{y}_i / p_i \quad (11)$$

Here, $p_i$ is defined as follows:

$$p_i = \sqrt{\sum_{j=1}^{d} \tilde{y}_{ij}^2} \quad (12)$$

The feature $y_i$ and the normalizing parameter $p_i$ are stored respectively in the feature data file 400 and the normalizing parameter data file 450 as the (i)th data.

Figure 12:
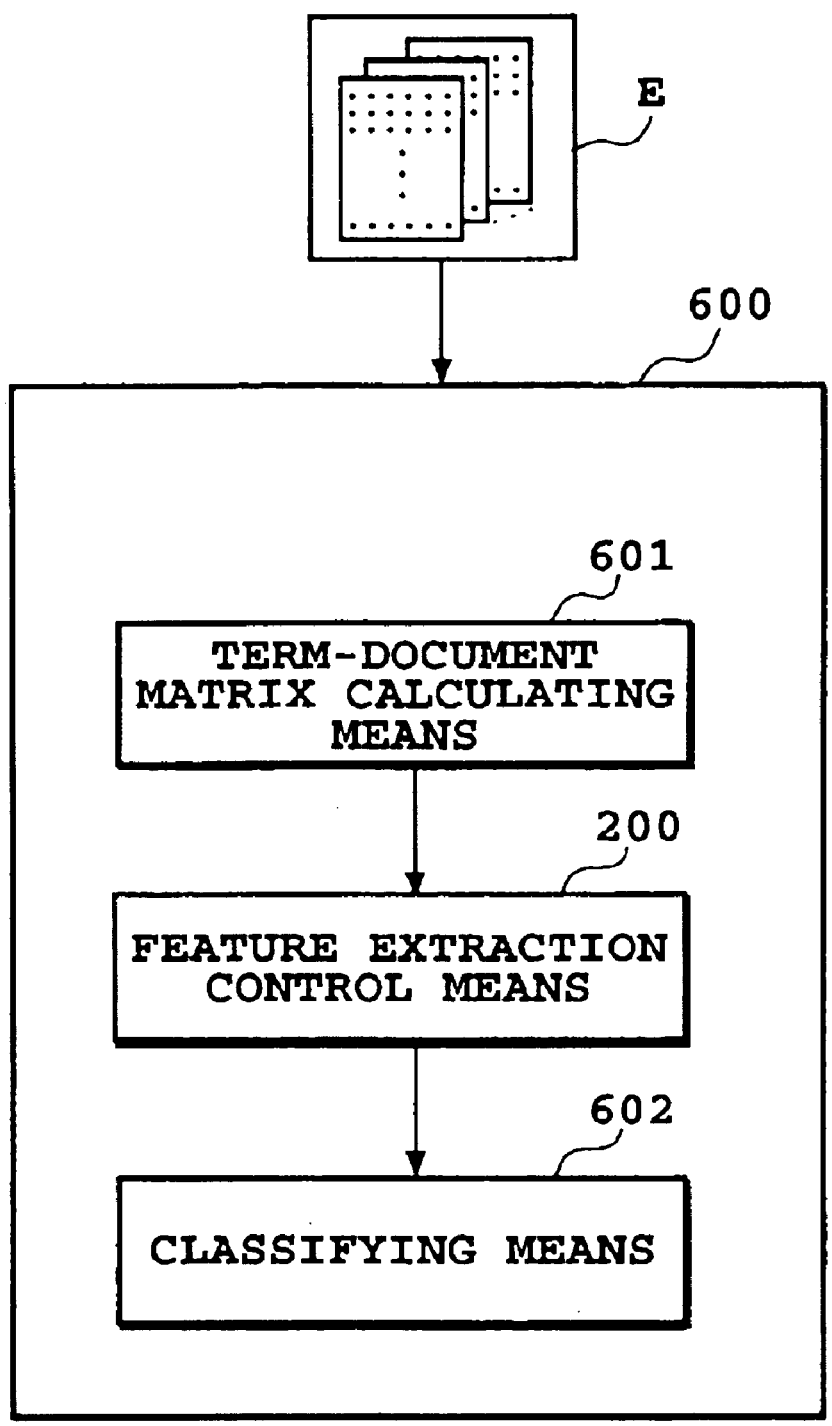
FIG. 12 is an illustration showing one example of an automatic document classifying system employing one embodiment of the feature extracting apparatus according to the present invention.

FIG. 12 is an illustration showing one example of an automatic document classifying system employing the shown embodiment of the feature extracting apparatus. In FIG. 12, the reference numeral 601 denotes term-document matrix calculating means, 602 denotes classifying means. The classifying means 602 may be implemented by a method disclosed in "Journal of Intelligent and Fuzzy Systems", published on 1993, Vol. 1, No. 1, Pages 1 to 25.

The document data stored in the document database E is taken in the automatic document classifying system 600. In the automatic document classifying system 600, a term-document matrix is derived in the term-document matrix calculating means 601. The result of calculation of the term-document matrix is transferred to the feature extraction control means 200. The feature extraction control means 200 extracts the features from the received term-document matrix. The extracted result is output to the classifying means 602. In the classifying means 602, the result of classification is output on the basis of the input features.

To evaluate the present invention, feature extraction of actual document data related to an entrance examination system was performed. It has been confirmed that the present invention could extract the features of the same nature as those extracted using the conventional LSA.

Next, concerning the size of the memory space, in a typically practical case where the number of terms t is significantly greater than number of documents d (t>>d), the conventional LSA requires in the order of $t^2$ of the memory size, the present invention merely requires the memory size in the order of t·d for calculating respective basis vectors. Furthermore, in order to realize the prior art, a complicated matrix operation apparatus is required. The system according to the invention, however, can be easily realized with an apparatus that performs simple arithmetic operations. Namely, according to the present invention, the LSA feature extraction can be performed using a smaller memory space and a simpler program. In addition, this simple program may be loaded in a digital signal processor (DSP). Therefore, a specific chip for feature extraction can be produced easily.

Hereinafter, the results of respective means executing the shown embodiment of the feature extracting apparatus for the documents of FIG. 1 and the question of FIG. 3 will be shown.

A. Documents of FIG. 1
First, let X denote the term-document matrix of FIG. 2.
I. First Iteration in Feature Extraction Control Means 200 (i=1)
According to the foregoing expression (5), the term-document matrix updating means 210 outputs E(1) expressed by the following expression to the basis vector calculating means 220 and the feature extracting means 230.

$$E(1) = \begin{bmatrix} 1 & 0 & 0 \\ 1 & 0 & 0 \\ 1 & 0 & 0 \\ 1 & 0 & 1 \\ 1 & 0 & 1 \\ 0 & 1 & 0 \\ 0 & 1 & 0 \\ 0 & 1 & 1 \\ 0 & 1 & 1 \\ 0 & 1 & 0 \\ 0 & 0 & 1 \end{bmatrix}$$

In the basis vector calculating means 220, initialization is performed with setting the basis vector $w_i(1)$ at [0.0100, −0.0100, 0.0100, −0.0100, 0.0100, −0.0100, 0.0100, −0.0100, 0.0 100, −0.0100, 0.0100]', $\mu_1$ at a fixed value 0.1, $\beta_1$ at $1 \times 10^{-6}$. The calculation shown in FIG. 11 is performed for a hundred thirty-two times. Then, the basis vector $w_1$=[0.1787, 0.1787, 0.1787, 0.4314, 0.4314, 0.1787, 0.1787, 0.4314, 0.4314, 0.1787, 0.2527]' is stored in the basis vector data file 300, and output to the feature extracting means 230 and the term-document matrix updating means 210.

First Repetition in Basis Vector Calculating Means 220 (k=1)
From the foregoing expression (8), $w_1(2)$=[0.0103 −0.0097, 0.0103, 0.0093, 0.0107, −0.0103, 0.0097, −0.0100, 0.0100, −0.0103, 0.0103]'

$w_1(2) - w_1(1) = 10^{-3} \times$[0.3332, 0.3334, 0.3332, 0.6668, 0.6666, −0.3332, −0.3334, 0.0001, −0.0001, −0.3332, 0.3332]'

$\delta_1(1)$=0.0103

Second Repetition in Basis Vector Calculating Means 220 (k=2)
From the foregoing expression (8), $w_1(3)$=[0.0107, −0.0093, 0.0107, −0.0085, 0.0115, −0.0107, 0.0093, −0.0100, 0.0100, −0.0107, 0.0107]'

$w_1(3) - w_1(2) = 10^{-3} \times$[0.4110, 0.4112, 0.4110, 0.8001, 0.7998, −0.3665, −0.3668, 0.0224, 0.0221, −0.3665, 0.3887]'

$\delta_1(2)$=0.0015

—syncopated—
A Hundred Thirty-Second Repetition in Basis Vector Calculating Means 220 (k=132)
From the foregoing expression (8), $w_1(133)$=[0.1787, 0.1787, 0.1787, 0.4314, 0.4314, 0.1787, 0.1787, 0.4314, 0.4314, 0.1787, 0.2527]'

$w_1(133) - w_1(132) = 10^{-6} \times$[−0.3020, −0.3020, −0.3020, −0.3020, −0.3020, 0.3020, 0.3020, 0.3020, 0.3020, 0.0000]'

$\delta_1(132) = 9.5500 \times 10^{-7}$

In the feature extracting means 230, the operations shown in the expressions (11) and (12) are performed for outputting:

$y_1$=[0.5000, 0.5000, 0.7071]

and $p_1=2.7979$ to the feature data file 400 and the normalizing parameter data file 450.

II. Second Iteration in Feature Extraction Control Means 200 (i=2)

In the term-document matrix updating means 210, from the foregoing expression (5), E(2) expressed as follows is output to the basis vector calculating means 220 and the feature extracting means 230:

$$E(2) = \begin{bmatrix} 0.7500 & -0.2500 & -0.3536 \\ 0.7500 & -0.2500 & -0.3536 \\ 0.7500 & -0.2500 & -0.3536 \\ 0.3964 & -0.6036 & 0.1464 \\ 0.3964 & -0.6036 & 0.1464 \\ -0.2500 & 0.7500 & -0.3535 \\ -0.2500 & 0.7500 & -0.3535 \\ -0.6036 & 0.3965 & 0.1465 \\ -0.6036 & 0.3965 & 0.1465 \\ -0.2500 & 0.7500 & -0.3535 \\ -0.3536 & -0.3535 & 0.5000 \end{bmatrix}$$

In the basis vector calculating means 220, initialization is performed with setting the basis vector $w_2(1)$ at [0.0100, −0.0100, 0.0100, −0.0100, 0.0100, −0.0100, 0.0100, −0.0100, 0.0100, −0.0100, 0.0100]′, $\mu_2$ at a fixed value 0.1, $\beta_2$ at $1\times10^{-6}$. The calculation shown in FIG. 11 is performed for a hundred nineteen times. Then, the basis vector $w_2$= [0.3162, 0.3162, 0.3162, 0.3162, 0.3162, −0.3162, −0.3162, −0.3162, −0.3162, −0.3162, 0.0000]′ is stored in the basis vector data file 300, and output to the feature extracting means 230 and the term-document matrix updating means 210.

First Repetition in Basis Vector Calculating Means 220 (k=1)

From the foregoing expression (8), $w_2(2)=[0.0102, -0.0098, 0.0102, -0.0096, 0.0104, -0.0105, 0.0095, -0.0103, 0.0097, -0.0105, 0.0102]'$ $w_2(2)-w_2(1)=10^{-3}\times[0.2154, 0.2156, 0.2154, 0.3822, 0.3821, -0.4511, -0.4513, -0.2844, -0.2846, -0.4511, 0.1666]'$ $\delta_2(1)=0.0011$ Second Repetition in Basis Vector Calculating Means 220 (k=2)

From the foregoing expression (8), $w_2(3)=[0.0105, -0.0095, 0.0105, -0.0092, 0.0108, -0.0110, 0.0090, -0.0106, 0.0094, -0.0110, 0.0103]'$ $w_2(3)-w_2(2)=10^{-3}\times[0.2624, 0.2626, 0.2624, 0.4413, 0.4411, -0.5152, -0.5154, -0.3364, -0.3366, -0.5152, 0.1786]'$ $\delta_2(2)=0.0013$ —syncopated—

A Hundred Nineteenth Repetition in Basis Vector Calculating Means 220 (k=119)

From the foregoing expression (8), $w_2(120)=[0.3162, 0.3162, 0.3162, 0.3162, 0.3162, -0.3162, -0.3162, -0.3162, -0.3162, 0.0000]'$ $w_2(120)-w_2(119)=10^{-6}\times[0.3327, 0.3333, 0.3327, -0.1375, -0.1381, 0.3332, 0.3326, -0.1377, -0.1383, 0.3332, -0.4712]'$ $\delta_2(119)=9.8141\times10^{-7}$ In the $_{feature}$ extracting means 230, the operations shown in the expressions (11) and (12) are performed for outputting:

$y_2=[0.7071, -0.7071, -0.0000]$ and $p_2=2.2361$ to the feature data file 400 and the normalizing parameter data file 450.

From the results set forth above, the feature vectors of the documents 1, 2 and 3 in FIG. 1 are respectively [0.5000, 0.7071]′, [0.5000, −0.7071], [0.7071, −0.0000]. Comparing these with the features of the LSA of respective documents shown in the explanation of the prior art, the second element of each vector is of opposite sign but has the same absolute value. Accordingly, concerning calculation of similarity in the expression (2), they have the same nature as the features of LSA.

B. Question of FIG. 3

Here, let us use the basis vectors stored in the basis vector data file 300 and the normalizing parameters stored in the normalizing parameter data file 450 during extraction of the features of the documents of FIG. 1. Thereby, execution of the basis vector calculating means 220 and calculation of the normalizing parameter in the feature extracting means 230 are omitted. Let X denote the term-document matrix of FIG. 4.

I. First Iteration in Feature Extracting Means 200 (i=1)

In the term-document matrix updating means 210, E(1) expressed as follows from the foregoing expression (5) is output to the feature extracting means 230.

$$E(1) = \begin{bmatrix} 0 \\ 0 \\ 1 \\ 1 \\ 1 \\ 1 \\ 1 \\ 0 \\ 1 \\ 0 \\ 0 \end{bmatrix}$$

In the feature extracting means 230, arithmetic operation according to the foregoing expressions (11) and (12) is performed using the feature vector $w_1$ and the normalizing parameter $p_1$ obtained upon extraction of the features of the documents of FIG. 1 to output $y_1=[0.6542]$ to the feature data file 400.

II. Second Iteration in Feature Extraction Control Means 200 (i=2)

In the term-document matrix updating means 210, using the feature vector $w_1$ obtained upon performing feature extraction of the documents shown in FIG. 1, from the foregoing equation (5), E(2) expressed as follows is output to the feature extracting means 230.

$$E(2) = \begin{bmatrix} -0.3271 \\ -0.3271 \\ 0.6729 \\ 0.2103 \\ 0.2103 \\ 0.6729 \\ 0.6729 \\ -0.7897 \\ 0.2103 \\ -0.3271 \\ -0.4626 \end{bmatrix}$$

In the feature extracting means 230, arithmetic operation according to the foregoing expressions (11) and (12) is performed using the feature vector $w_2$ and the normalizing parameter $p_2$ obtained upon extraction of the features of the documents of FIG. 1 to output $$y_2=[-0.0000]$$

to the feature data file 400.

From the result set forth above, the feature vector of the question of FIG. 3 becomes [0.6542, −0.0000]', comparing the value explained in the prior art, the second element has the same absolute value.

The present invention has been described in detail with respect to preferred embodiments. It will now be apparent from the foregoing to those skilled in the art that broader aspect. It is the intention, therefore, in the apparent claims to cover all such changes and modifications as fall within the true spirit of the invention.

What is claimed is:

1. A text mining method for extracting features of documents using a term-document matrix consisting of vectors corresponding to index terms representing the contents of the documents, wherein contributions of the index terms act on respective elements of the term-document matrix, said method comprising:
   a basis vector calculating step of calculating a basis vector spanning a feature space, in which mutually associated documents and terms are located in proximity with each other, based on a steepest descent method minimizing a cost;
   a feature extracting step of calculating a parameter for normalizing the features using the term-document matrix and the basis vector and extracting the features on the basis of the parameter; and
   a term-document matrix updating step of updating the term-document matrix to a difference between the term-document matrix, to which the basis vector is not applied, and the term-document matrix, to which the basis vector is applied.

2. A text mining method for extracting features of documents as claimed in claim 1, wherein the cost is defined as a second-order cost of the difference between the term-document matrix, to which the basis vector is not applied, and the term-document matrix, to which the basis vector is applied.

3. A text mining method for extracting features of documents as claimed in claim 2, wherein said basis vector calculating step comprises:
   an initializing step of initializing a value of the basis vector;
   a basis vector updating step of updating the value of the basis vector;
   a variation degree calculating step of calculating a variation degree of the value of the basis vector;
   a judging step of making a judgment whether a repetition process is to be terminated or not using the variation degree of the basis vector; and
   a counting step of counting the number of times of said repetition process.

4. A text mining method for extracting features of documents as claimed in claim 3, wherein said basis vector updating step updates the basis vector using a current value of the basis vector, the term-document matrix and an updating ratio controlling the updating degree of the basis vector.

5. A text mining method for extracting features of documents as claimed in claim 4, wherein, when all basis vectors and normalizing parameters required in extracting the features have been already obtained, the calculation of normalizing parameters in said basis vector calculating step and the execution of said feature extracting step are omitted, and said feature extracting step extracts the features using the basis vectors and the normalizing parameters that have been already obtained.

6. A text mining method for extracting features of documents as claimed in claim 3, wherein, when all basis vectors and normalizing parameters required in extracting the features have been already obtained, the calculation of normalizing parameters in said basis vector calculating step and the execution of said feature extracting step are omitted, and said feature extracting step extracts the features using the basis vectors and the normalizing parameters that have been already obtained.

7. A text mining method for extracting features of documents as claimed in claim 2, wherein, when all basis vectors and normalizing parameters required in extracting the features have been already obtained, the calculation of normalizing parameters in said basis vector calculating step and the execution of said feature extracting step are omitted, and said feature extracting step extracts the features using the basis vectors and the normalizing parameters that have been already obtained.

8. A text mining method for extracting features of documents as claimed in claim 1, wherein said basis vector calculating step comprises:
   an initializing step of initializing a value of the basis vector;
   a basis vector updating step of updating the value of the basis vector;
   a variation degree calculating step of calculating a variation degree of the value of the basis vector;
   a judging step of making a judgment whether a repetition process is to be terminated or not using the variation degree of the basis vector; and
   a counting step of counting the number of times of said repetition process.

9. A text mining method for extracting features of documents as claimed in claim 8, wherein said basis vector updating step updates the basis vector using a current value of the basis vector, the term-document matrix and an updating ratio controlling the updating degree of the basis vector.

10. A text mining method for extracting features of documents as claimed in claim 9, wherein, when all basis vectors and normalizing parameters required in extracting the features have been already obtained, the calculation of normalizing parameters in said basis vector calculating step and the execution of said feature extracting step are omitted, and said feature extracting step extracts the features using the basis vectors and the normalizing parameters that have been already obtained.

11. A text mining method for extracting features of documents as claimed in claim 8, wherein, when all basis vectors and normalizing parameters required in extracting the features have been already obtained, the calculation of normalizing parameters in said basis vector calculating step and the execution of said feature extracting step are omitted, and said feature extracting step extracts the features using the basis vectors and the normalizing parameters that have been already obtained.

12. A text mining method for extracting features of documents as claimed in claim 1, wherein, when all basis vectors and normalizing parameters required in extracting the features have been already obtained, the calculation of normalizing parameters in said basis vector calculating step and the execution of said feature extracting step are omitted, and said feature extracting step extracts the features using the basis vectors and the normalizing parameters that have been already obtained.

13. A text mining apparatus for extracting features of documents using a term-document matrix consisting of vectors corresponding to index terms representing the contents of the document, wherein contributions of the index terms act on respective elements of the term-document matrix, said apparatus comprising:
basis vector calculating means for calculating a basis vector spanning a feature space, in which mutually associated documents and terms are located in proximity with each other, based on a steepest descent method minimizing a cost;
feature extracting means for calculating a parameter for normalizing the features using the term-document matrix and the basis vector and extracting the features on the basis of the parameter; and
term-document matrix updating means for updating the term-document matrix to a difference between the term-document matrix, to which the basis vector is not applied, and the term-document matrix, to which the basis vector is applied.

14. A text mining apparatus for extracting features of documents as claimed in claim 13, wherein the cost is defined as a second-order cost of the difference between the term-document matrix, to which the basis vector is not applied, and the term-document matrix, to which the basis vector is applied.

15. A text mining apparatus for extracting features of documents as claimed in claim 14, wherein said basis vector calculating means comprises:
initializing means for initializing a value of the basis vector;
basis vector updating means for updating the value of the basis vector;
variation degree calculating means for calculating a variation degree of the value of the basis vector;
judging means for making a judgment whether a repetition process is to be terminated or not using the variation degree of the basis vector; and
counting means for counting the number of times of said repetition process.

16. A text mining apparatus for extracting features of documents as claimed in claim 15, wherein said basis vector updating means updates the basis vector using a current value of the basis vector, the term-document matrix and an updating ratio controlling the updating degree of the basis vector.

17. A text mining apparatus for extracting features of documents as claimed in claim 16, wherein, when all the basis vectors and normalizing parameters required in extracting the feature have been already obtained, the calculation of normalizing parameters by said basis vector calculating means and the execution of said feature extracting means are omitted, and said feature extracting means extracts the features using the basis vectors and the normalizing parameters that have been already obtained.

18. A text mining apparatus for extracting features of documents as claimed in claim 15, wherein, when all basis vectors and normalizing parameters required in extracting the features have been already obtained, the calculation of normalizing parameters by said basis vector calculating means and the execution of said feature extracting means are omitted, and said feature extracting means extracts the features using the basis vectors and the normalizing parameters that have been already obtained.

19. A text mining apparatus for extracting features of documents as claimed in claim 14, wherein, when all basis vectors and normalizing parameters required in extracting the features have been already obtained, the calculation of normalizing parameters by said basis vector calculating means and the execution of said feature extracting means are omitted, and said feature extracting means extracts the features using the basis vectors and the normalizing parameters that have been already obtained.

20. A text mining apparatus for extracting features of documents as claimed in claim 13, wherein said basis vector calculating means comprises:
initializing means for initializing a value of the basis vector;
basis vector updating means for updating the value of the basis vector;
variation degree calculating means for calculating a variation degree of the value of the basis vector;
judging means for making a judgment whether a repetition process is to be terminated or not using the variation degree of the basis vector; and
counting means for counting the number of times of said repetition process.

21. A text mining apparatus for extracting features of documents as claimed in claim 20, wherein said basis vector updating means updates the basis vector using a current value of the basis vector, the term-document matrix and an updating ratio controlling the updating degree of the basis vector.

22. A text mining apparatus for extracting features of documents in text mining as claimed in claim 21, wherein, when all basis vectors and normalizing parameters required in extracting the feature have been already obtained, the calculation of normalizing parameters by said basis vector calculating means and the execution of said feature extracting means are omitted, and said feature extracting means extracts the features using the basis vectors and the normalizing parameters that have been already obtained.

23. A text mining apparatus for extracting features of documents as claimed in claim 20, wherein, when all basis vectors and normalizing parameters required in extracting the features have been already obtained, the calculation of normalizing parameters by said basis vector calculating means and the execution of said feature extracting means are omitted, and said feature extracting means extracts the features using the basis vectors and the normalizing parameters that have been already obtained.

24. A text mining apparatus for extracting features of documents as claimed in claim 13, wherein, when all basis vectors and normalizing parameters required in extracting the features have been already obtained, the calculation of normalizing parameters by said basis vector calculating means and the execution of said feature extracting means are omitted, and said feature extracting means extracts the features using the basis vectors and the normalizing parameters that have been already obtained.

25. A computer program product comprising a computer readable medium, on which a computer program is stored, the computer program causing a computer to execute the text mining method as claimed in claim 1.

* * * * *

UNITED STATES PATENT AND TRADEMARK OFFICE
CERTIFICATE OF CORRECTION

PATENT NO. : 6,882,747 B2
DATED : April 19, 2005
INVENTOR(S) : Ruck Thawonmas et al.

It is certified that error appears in the above-identified patent and that said Letters Patent is hereby corrected as shown below:

Column 10,
Line 25, after "In" remove "t".

Column 12,
Line 19, change "$w_i(1)$" to -- $w_1(1)$ --.
Line 20, change "0.0 100" to -- 0.0100 --.

Column 14,
Line 5, change "In the $_{feature}$" to -- In the feature --.

Column 15,
Line 32, after "in the art that" insert -- changes and modifications may be made without departing from the invention in its --.

Signed and Sealed this

Twenty-second Day of November, 2005

JON W. DUDAS
*Director of the United States Patent and Trademark Office*